Patented Oct. 19, 1954

2,692,290

UNITED STATES PATENT OFFICE 2,692,290

2,3,4,5,6 PENTACHLOROPHENYL ACETALDEHYDE

Sidney D. Ross, Williamstown, Mass., assignor to Sprague Electric Company, North Adams, Mass., a corporation of Massachusetts No Drawing. Application October 4, 1951, Serial No. 249,800

1 Claim. (Cl. 260—599)

This invention relates to pentachlorophenyl acetaldehyde, and in particular to various compositions employing this compound.

Benzaldehyde is an old and extremely widely used chemical intermediate which is extremely important in the manufacture of drugs, dyes, perfumes and the like.

The object of this invention is to produce a new benzaldehyde compound possessing properties which are improved over those properties of benzaldehyde. Related objects will be seen from the appended claim as well as from this specification.

The objects of this invention are attained by producing 2,3,4,5,6 pentachlorophenyl acetaldehyde, as for example, through the hydrolysis of an ethoxy pentachlorostyrene compound with sulfuric acid, or by hydrolysis of other similar ethoxy pentachlorostyrene compounds in similar manner. This method of preparation will be best illustrated with reference to the following example which is set forth by way of illustration only, and is not to be considered as limiting the invention in any manner.

Example I 2 grams of omega ethoxy pentachlorostyrene prepared as disclosed in the co-pending application, Serial No. 240,799 filed August 7, 1951, now Patent No. 2,643,270 entitled "Halogenated Compounds," 100 cc. of dioxane, 10 cc. of water, and 10 drops of concentrated $H_2SO_4$ was refluxed for 20 hours and then poured into water. 2 grams of a crude product having a melting point of 135–140° C. was separated out. This was then crystallized and recrystallized from methanol and water (2:1) to give a final yield of 1.75 grams having a melting point of from 132–134.5° C. The calculated analysis of this product was carbon 32.86%, hydrogen 1.03%; the actual analysis found was 32.68, 32.39% carbon, 1.12 and 1.21% hydrogen.

Example II

The same procedure as above was followed with 2 grams of omega methoxy pentachlorostyrene, 100 cc. dioxane, 10 cc. of water, 10 drops of concentrated $H_2SO_4$. The refluxed mixture was poured into water, and filtered, yielding 2 grams of crystals having a melting point of 130–135° C. This product was crystallized from acetic acid yielding 1.40 grams of product crystals having a melting point of 133–138° C.

Pentachlorophenyl acetaldehyde is particularly advantageous as an intermediate in organic syntheses. This includes the preparation of dyes, in which pentachlorophenyl acetaldehyde serves to modify the color and other properties of the final dye stuff. It may also be used as a flame proofing modifier for coating compositions. Further, it may be incorporated into the molecular structure of polyhydroxyl compounds and resins, as for example, in the preparation of polyvinyl acetal type resins, where the presence of the pentachloro-phenyl group imparts improved properties to the resin.

As many embodiments of this invention may be made without departing from the spirit and scope hereof it is to be limited only by the appended claim.

I claim:

2,3,4,5,6 pentachlorophenyl acetaldehyde.

References Cited in the file of this patent

UNITED STATES PATENTS

| Number | Name | Date |
|---|---|---|
| 998,140 | Weiler | July 18, 1911 |
| 2,360,301 | Emerson | Oct. 10, 1944 |
| 2,444,400 | Emerson | June 29, 1948 |